Sept. 20, 1932.  J. HILGERS  1,878,850
PROTECTIVE DEVICE FOR TABLES
Filed March 16, 1929
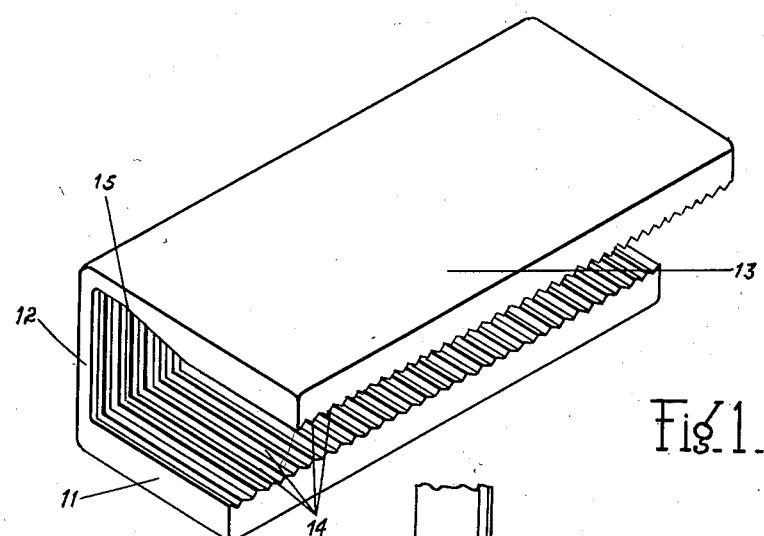
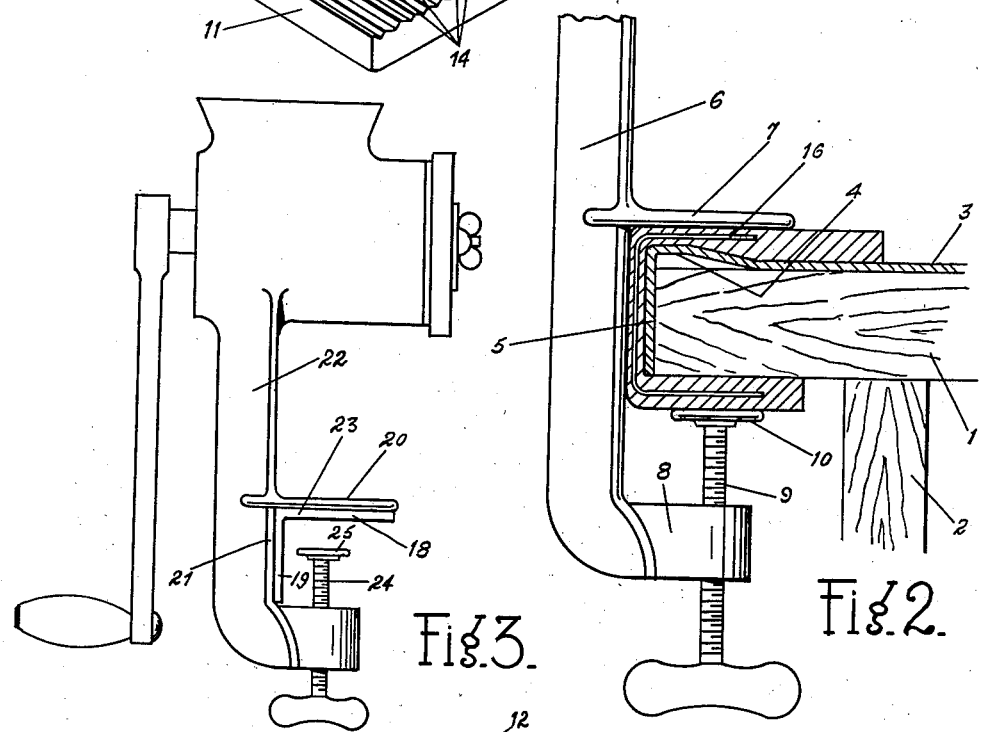
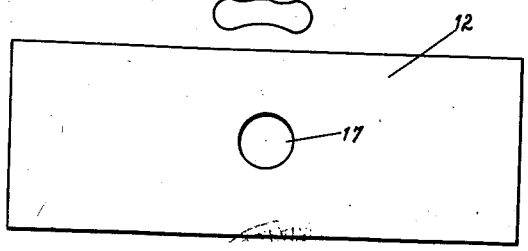
INVENTOR.
JOHN HILGERS.
BY
*Philip S. Hopkins*
ATTORNEY Patented Sept. 20, 1932

1,878,850

UNITED STATES PATENT OFFICE

JOHN HILGERS, OF BINGHAMTON, NEW YORK

PROTECTIVE DEVICE FOR TABLES

Application filed March 16, 1929. Serial No. 347,567.

My invention relates to a protective device for tables, and is primarily useful as a means for protecting the edge of enameled metal top tables, enameled wooden table tops, kitchen cabinets, cupboards and the like, commonly used in the kitchen and upon which meat grinders, knife sharpeners, bread slicers and other utensils are clamped.

As is well known, the usual clamping device for meat grinders and other instruments of like character is of bar metal with the result that when the same is tightly clamped to the edge of an enameled table, the table is marred through cracking and shipping and scratching of the enamel and furthermore, it is extremely difficult to tighten the clamp on the smooth enameled surface sufficiently to render the grinder or other instrument rigid for use. The result is that the grinder twists and creeps on the enamel surface to the annoyance of the user and to the decided detriment of the table.

Many expedients are resorted to by housewives to overcome this difficulty with a marked lack of success.

I have provided a device which overcomes the difficulties above mentioned and which protects the table and affords an effective clamping surface for the clamp of the grinder or other instrument whereby the same is rigidly held during use.

As is well known, the edges of tables provided with these enameled tops have a bead extending slightly upwardly around the table top. This bead contributes greatly to the difficulty involved in effectively clamping the grinder or other instrument thereto. By my invention I have provided means for overcoming this difficulty and providing for the clamp a flat surface against which the clamping elements are drawn.

Other objects and advantages in details of construction and arrangement of parts will be apparent as the description proceeds, reference now being had to the figures of the accompanying drawing forming a part of this application and wherein like reference numerals indicate like parts.

In the drawing:

Figure 1 is a detail perspective view of my invention.

Figure 2 is a detail cross sectional view illustrating the use of my invention in connection with the clamping means of a meat grinder, certain parts being broken away for clearness.

Figure 3 is a detail side view of a meat grinder showing my invention applied thereto in a modified manner.

Figure 4 is a detail rear view of my invention.

The reference numeral 1 indicates a table top supported by the usual legs 2 and covered with the usual enameled metal top 3, provided adjacent the edge with an upwardly extending bead 4 and with the downwardly turned flange 5 covering the edge of the table top 1. It is to this edge of the table thus presented that the meat grinder or other instrument or utensil 6 is clamped for use. Although I have shown a meat grinder and will describe the invention from here on with relation to such an instrument, it will be understood that the invention is not limited to use therewith but is capable of use with any instrument or utensil provided with clamping means for securing it to the edge of a table, bench or the like.

The grinder 6 is provided with an inwardly extending upper clamping surface 7 adapted to engage the upper side of the table top. The lower end of the grinder 6 is provided with an inwardly turned bearing 8 through which is threaded the clamping screw 9 provided at its inner end with the clamping disk 10 engageable with the under side of the table top 1. This construction is well known in the art and while it varies in detail as to arrangement and form of the clamping parts in different instruments, the form shown is illustrative for the purpose of clearly describing my invention.

My invention proper consists of a protective gripping member adapted to cooperate with the clamping elements of the grinder whereby to provide an effective gripping surface for the clamp and also to protect the enameled table top 3 from marring by the clamp. This protective member is shown in the drawing as a length of channel rubber or other suitable material molded or otherwise formed to substantially the shape shown clearly in Figures 1 and 2. The material of this protective device is preferably rubber and also preferably hard rubber, although I do not wish to be limited to such as the material, inasmuch as fiber, fabric, cork and perhaps other materials may be substituted for rubber. The form of the protective device shown in Figures 1 and 2 includes a flat bottom flange 11, a rear vertical flange 12 and an upper or overlying flange 13 substantially wider than the lower flange 11. The inner surface of the protective device is preferably corrugated in some suitable fashion as at 14 and configuration in order to provide an effective frictional gripping surface for the edge of the table over which it is placed in the manner shown in Figure 2. The thickness of the material making up this protective device may be predetermined for the most effective service but preferably the rear or vertical flange 12 thereof is relatively thin with respect to the upper and lower flanges so as to permit the clamp of the grinder to reach as far as possible over the edge of the table top.

It will be observed particularly with reference to Figures 1 and 2 that the upper flange 13 of this device is provided adjacent its inner edge with a recessed portion 15 conforming in shape to the bead 4 at the edge of the enameled top 3 of the table. Therefore, when the protective device is slipped over the edge of the table, the upper and lower flanges 13 and 11 yielding sufficiently to permit such disposition, the device will assume a close fitting engagement at all points with the table top and due to the recess 15, the upper surface of the flange 13 will be perfectly flat for receiving the flat clamping member 7 of the grinder.

In order to strengthen and reinforce this rubber protective device, I have provided a fabric or other suitable reinforcement layer or interliner 16 extending for a substantial portion of the width of the flanges 11, 12 and 13. This reinforcing interliner may be molded as a layer with the molding of the rubber protective device in the mold or if the device is made up of laminated strips, it may be vulcanized in position. This interliner of fabric or other suitable material adds greatly to the strength of wearing qualities of the protective device and reinforces it particularly at the thin rear portion 12.

Inasmuch as some types of tables in connection with which this protective device will be very useful, are of such construction that screws or other fastening elements are provided to secure the depending flange 5 of the enameled top to the woodwork of the table, I have provided the rear vertical flange 12 of my device with an opening 17 which may be positioned over such screws or fastening devices and thus permit the flange to fit snugly against the edge of the table top.

In Figure 3, I show a modified form of this invention wherein the upper flange 13 and rear vertical flange 12 only of the protective device are used, indicated in Figure 3 as 18 and 19 respectively and in this form these flanges are suitably secured as by screws or gluing or in any other suitable manner to the upper clamping member 20 and the inner surface of the clamping bracket 21 of the grinder. The construction of this gripping device may be the same as that shown for the flanges 12 and 13 in Figures 1 and 2, and including the fabric interliner 16 and a recess 23 to fit over the bead 4 of the table top. In the use of this form of my invention, the clamping screw 24 with its clamping disk 25 will engage directly against the underside of the table top.

Of course, changes may be made in details of construction without departing from the spirit and scope of my invention. I do not limit myself, therefore, to the exact structure herein shown and described other than by the appended claims.

I claim:

1. A protective device for tables and the like comprising a separate pre-formed angular member of fixed shape having a horizontal flange and a vertical flange adapted to engage the top and side respectively of a table edge, the inner surface of said horizontal flange conforming to the contour of said table edge.

2. A protective device for tables and the like comprising a separate pre-formed angular member of fixed shape having a horizontal flange and a vertical flange adapted to engage the top and side respectively of a table edge, the inner surface of said horizontal flange conforming to the contour of said table edge, and a reinforcing element embedded in said flanges.

3. A protective device for tables and the like comprising a separate molded friction member of substantially channel shape adapted to embrace a table edge on the top, side and bottom, the upper and lower flanges of the member being relatively thicker than the side flange.

4. A protective device for tables and the like comprising a separate pre-formed friction member of substantially fixed channel shape adapted to embrace a table edge on the top, side and bottom, the upper and lower flanges of the member being relatively thicker than the side flange, and a reinforcing element embedded in said flanges.

5. A protective device for tables and the like comprising a separate pre-formed friction member of channel shape adapted to embrace a table edge on the top, side and bottom, the upper and lower flanges of the member being relatively thicker than the side flange, and a reinforcing element embedded in said flanges, the inner surface of said member being pre-formed to conform to the configuration of the table edge, and the outer surface of said member providing flat clamping surfaces for the clamping device of an instrument to be secured thereto.

In testimony whereof, I affix my signature.

JOHN HILGERS.